Dec. 18, 1934.  J. M. G. FULLMAN  1,984,873
METHOD OF MANUFACTURING NUTS
Filed Dec. 3, 1932  3 Sheets-Sheet 1
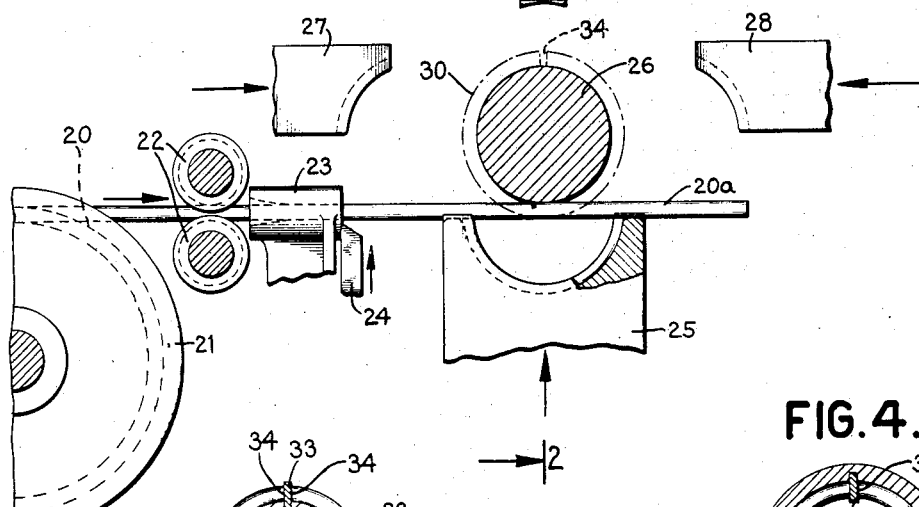
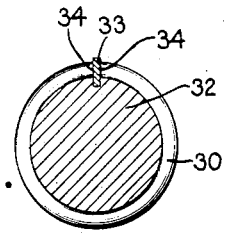
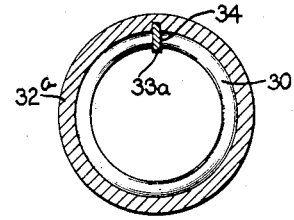
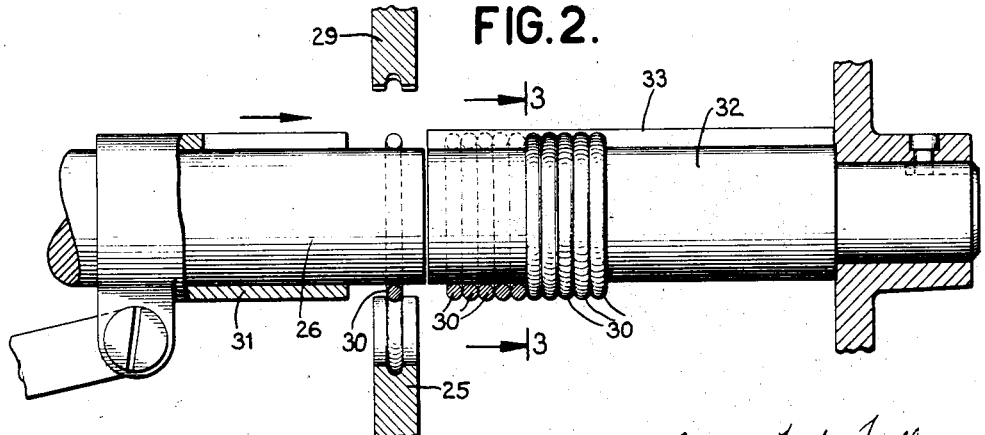

Dec. 18, 1934.   J. M. G. FULLMAN   1,984,873
METHOD OF MANUFACTURING NUTS
Filed Dec. 3, 1932   3 Sheets-Sheet 2
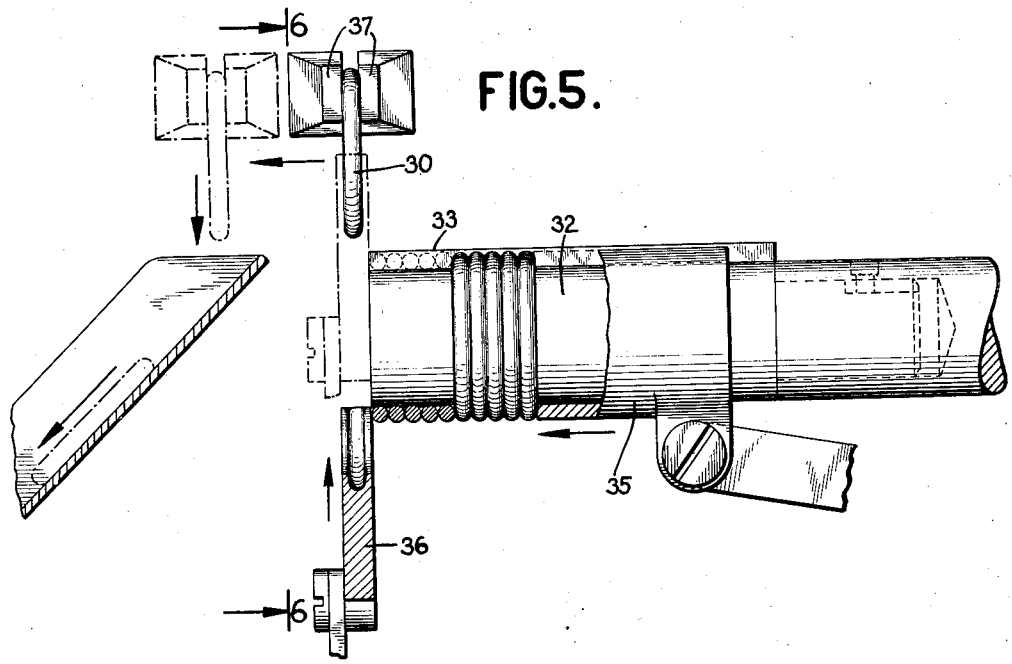
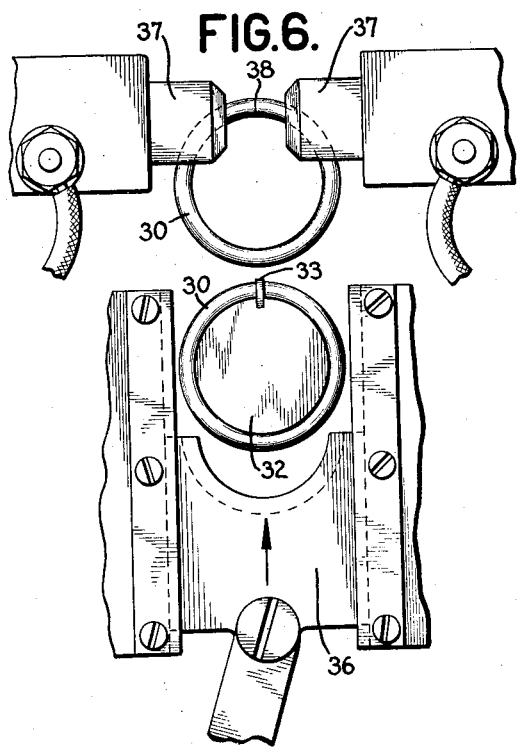
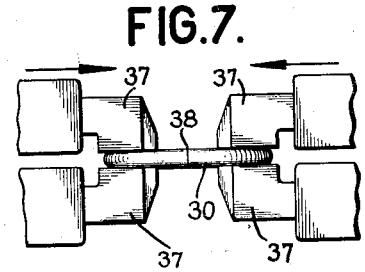
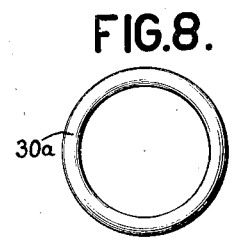
James M. G. Fullman
INVENTOR
BY Cooper, Kerr & Dunham
ATTORNEYS Dec. 18, 1934.   J. M. G. FULLMAN   1,984,873
METHOD OF MANUFACTURING NUTS
Filed Dec. 3, 1932   3 Sheets-Sheet 3

James M. T. Fullman
INVENTOR

BY Cooper, Kerr & Dunham
ATTORNEYS

Patented Dec. 18, 1934

1,984,873

UNITED STATES PATENT OFFICE 1,984,873

METHOD OF MANUFACTURING NUTS

James M. G. Fullman, Sewickley, Pa., assignor to National Electric Products Corporation, New York, N. Y., a corporation of Delaware Application December 3, 1932, Serial No. 645,506

5 Claims. (Cl. 10—86)

This invention relates to improvements in threaded nuts and methods of making the same and more particularly relates to methods for making the types of nuts which are used in the electrical wiring art, in conduit work connectors, etc.

According to present common manufacturing practices steel nuts are usually blanked out from sheet or strip material by means of punch presses. Such practice is exceedingly wasteful of material since usually the disk which is punched out from the center, as well as the material which is cut off to shape the exterior of the blanks, has to be scraped. Furthermore in punching the disk out from the center, the inside surface of the nut blank which is to be subsequently threaded is badly torn and fractured due to the shearing strains during punching and due to the fact that the grain of the metal is cut at planes which vary from planes at right angles to the grain of the metal to planes parallel thereto. Such tearing and fracturing of the metal produces weakness and irregularities in the subsequently formed threads.

The present invention is directed to the provision of an improved nut and to an improved method of making nuts.

One object of the present invention resides in the provision of an improved nut and method of making the same wherein a minimum amount of material may be used in the manufacture of the nuts and wherein the amount of scrap may be materially reduced.

Another object of the present invention resides in the provision of an improved nut and method of manufacturing the same wherein the inner threaded surface of the nut is in the original state in which the nut forming material was rolled or drawn at the mill.

Another object of the present invention resides in the provision of a nut which may be made with the outside ribs or notches pre-formed in the rod or strip from which the nut is made.

Another object of the present invention resides in the provision of a nut and method of making the same wherein bonding teeth may be provided as an incident to the fabrication of the nut, these bonding teeth being formed from the metal which is removed to provide the notches or wrench receiving portions around the outer perimeter of the nut.

A further object of the present invention resides in the provision of a nut which is simpler and cheaper to manufacture than nuts now made and also in the provision of a cheaper and simpler method of nut manufacture.

Further and other objects of the present invention will be hereinafter set forth in the accompanying specification and claims and shown in the drawings which by way of illustration show what I now consider to be preferred embodiments of the invention.

In carrying out the present invention I take drawn wire preferably round in shape, although material of other shape in cross section may be used, then cut off the wire to definite lengths, then form each cut off length into an open ring. The successively formed rings are pushed from the ring forming machine on to a mandrel, which preferably has a rib which fits into the opening of the rings. In this way the ring openings are properly aligned for the subsequent welding step.

The next step in the manufacture comprises the feeding of the rings off from the mandrel into an electric welding machine in which the rings are grasped and welded at the open joints.

The foregoing operations may be continuous by the use of automatic machines or they may be performed as separate steps in separate machines. After welding the rings are placed in a press, either singly or in multiple and in the press the rings are squeezed between a punch and die to form and shape ribs upon the exterior perimeter of the rings. The final operation comprises the threading of the interior of the rings. If desired and preferred, a formed or notched wire may be used in place of plain wire or rod and the rings may be formed so as to leave the notches on the external perimeter. In this way the press operation above mentioned may be eliminated.

In the drawings:

Figure 1 shows somewhat diagrammatically the cutting off and ring forming machine;

Fig. 2 shows the step and device for removing the open rings from the ring forming machine and for aligning the rings upon the ribbed aligning mandrel;

Fig. 3 is a detail sectional view taken on line 3—3 of Fig. 2 showing the manner in which the ribbed aligning mandrel aligns the open points of the rings;

Fig. 4 is a sectional view of a modified ring aligning means in which, in lieu of a ribbed mandrel, a tube is employed to receive the rings, the tube being provided with an inwardly extending tongue to extend into the ring openings and align the ring;

Fig. 5 shows the step and device for delivering the rings to the welding machine;

Fig. 6 is an elevational view taken substantially on line 6—6 of Fig. 5;

Fig. 7 is a plan view of the welding electrodes and shows these welding electrodes pressing the ends of a ring together and welding the joints;

Fig. 8 shows the ring after welding;

Fig. 14 is a detail view showing an initially notched wire or rod which may be used in lieu of a smooth wire or rod when the press step is to be dispensed with.

Figure 9:
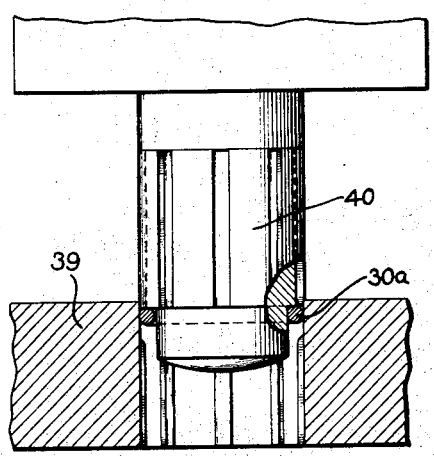
Fig. 9 shows the step of pressing the rings and providing the external ribs thereon.
Figure 12:
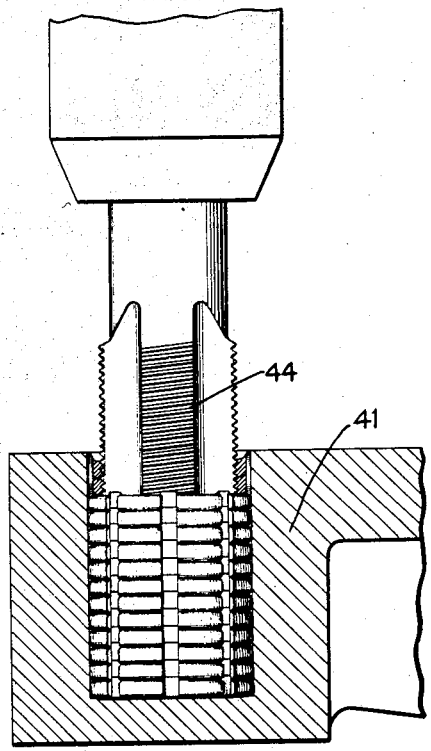
Fig. 12 shows the threading of the interior of the rings.
Figure 10:
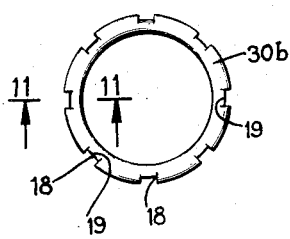
Fig. 10 shows a plan view of a ribbed ring after leaving the press.
Figure 11:
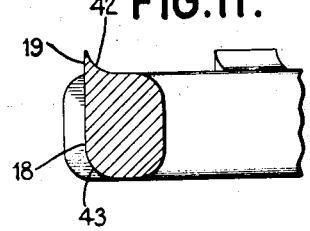
Fig. 11 is a detail sectional view of the ring shown in Fig. 10, the section being taken on line 11—11 of Fig. 10.
Figure 13:
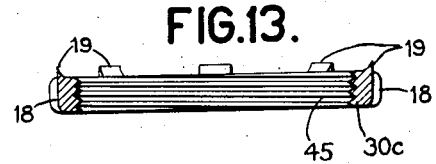
Fig. 13 shows a sectional view of a completed threaded nut.

Referring to the drawings and more particularly to Fig. 1, the wire 20 is fed off from a reel 21, through rolls 22 to a die 23. At the die a cutting knife 24 cuts off the wire 20 to a piece of a definite length. Thereafter a sliding block 25 advances, pressing the cut off length of wire 20a against a form 26. As the sliding block 25 advances, blocks 27 and 28 advance simultaneously from either side, moving in the direction indicated by the arrows and block 29 advances from above in the direction indicated by the arrow and press the cut off length of wire 20a against the form 26, thus making an open ended ring 30. The ring thus formed may be pushed off from the form 26 by means of a stripper 31 (see Fig. 2) on to a mandrel 32. This mandrel has a projection or key 33 which enters the opening gap 34 of the ring 30 (see Figs. 2 and 3), thus keeping all of the rings in line. In lieu of using the ribbed mandrel 32—33, the rings can be pushed into a tube 32a (Fig. 4) provided with an inner projecting tongue 33a fitting into the openings 34 of the rings 30. The mandrel 32 is then taken to an electric welding machine (see Fig. 5). At this electric welding machine, a pusher 35 or other implement can be used to push the rings off one by one from the mandrel 32. After a ring has been pushed off from the mandrel, a slide 36 can carry each ring 30 upwardly as indicated, to a position where the ring may be grasped by electrodes 37 (see Figs. 6 and 7). After the ring has been grasped by the electrodes, the electrodes are advanced to force the open edges of the ring together. Current passing through the electrodes and the ring will fuse the metal and make a weld at the abutting edges 38. The completed welded ring then has the configuration shown in Fig. 8. The rings here designated 30a. After welding the ring can be removed from the electrodes in any desired manner. Each welded ring 30a is then placed in a die 39 (see Fig. 9) and pressed through the die by means of a punch 40. The punching operation may be performed with single rings or with a multiple set of superimposed rings as desired. During this punching operation a portion of the outer periphery of the metal of the ring is displaced forming notches 18 in the outer perimeter and bonding teeth 19. Fig. 10 shows the ring after the press operation is performed thereon. In this figure there are a plurality of notches 18 in the outer perimeter of the ring and the bonding teeth 19 are struck up from the material of the ring. The notched rings are then placed in a holder 41 (Fig. 12). It will be noted that the rings nest upon one another in this holder. The configuration of an interior curve 42 of the tooth 19 is of such radius as to allow the outer radius 43 to nest properly. A tap 44 is then forced down through a group of rings to cut a thread on the inner perimeter of each ring as shown at 45 in Fig. 13. 30c designates the completed ring, with the internal threads 45, the bonding teeth 19 and the notches 18 in the perimeter of the ring.

Figure 14:
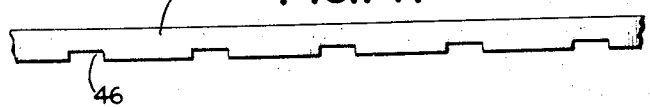

In lieu of using a plain wire or rod a prenotched wire or rod 20c (Fig. 14) may be used, provided with initial notches 46. If a wire of this shape is carried through the cutting off, welding and tapping operations, the product after welding would be a ring similar to Fig. 10 without the bonding teeth 19. By proceeding in this manner the necessity of a press operation would be eliminated.

It will be understood that the configuration of the ribs or notches on the rings may vary and that various forms of notches for the wrench engaging portion of the nuts and various forms of teeth may be formed or if desired the rings may be provided with notches and without bonding teeth. Furthermore various configurations of pre-formed wire may be used depending upon the configuration of the nut which is desired to be made. The material which may be used may be a rod, bar or strip of wire. The term "wire" will hereinafter be used to broadly define all of this kind of material.

What I claim is:

1. A threaded ring for use as a nut formed of wire with a welded joint so as to be endless and with spaced integral teeth extending upwardly out of the plane of the ring to provide bonding teeth and with interior threads on the ring.

2. The method of manufacturing nuts which comprises the cutting off of a wire to desired definite length, bending the cut off length of wire into a circular ring form, then welding the abutting ends of the ring, forming portions of the outer perimeter of the ring out of the general plane of the ring to provide spaced teeth around the ring and threading the interior of the ring.

3. The method of manufacturing nuts which comprises the cutting off of a wire to desired definite lengths, bending the cut off lengths of wire to ring form, then aligning the open portion of a multiplicity of said rings, then advancing the rings in succession while aligned, then welding the open portion of each ring and then threading the interior of the ring.

4. The method of manufacturing nuts which comprises the cutting off of a wire to definite lengths, bending each cut off length of wire into circular ring form with an opening between the ends thereof, then by said opening aligning a series of rings and while alignment is maintained delivering the rings in succession for welding and then closing the opening of each ring and while the ends of each ring are in abutting relation directing welding current therethrough and welding the abutting ends of the ring and finally threading the interior of the ring.

5. The method of manufacturing nuts which comprises the cutting off of a wire to desired definite lengths, bending the cut off lengths of wire into a circular ring form, then welding the abutting ends of the ring, then superimposing a plurality of the welded ring and displacing the outer metal of each of the superimposed rings to form notches in the outer perimeter thereof, and then tapping a plurality of superimposed rings to provide the interior threads.

JAMES M. G. FULLMAN.